(12) United States Patent
Yamamoto

(10) Patent No.: US 7,818,022 B2
(45) Date of Patent: Oct. 19, 2010

(54) COMMUNICATION APPARATUS AND ELECTRIC POWER CONTROL METHOD

(75) Inventor: Tetsuya Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 11/610,580

(22) Filed: Dec. 14, 2006

(65) Prior Publication Data

US 2007/0149140 A1  Jun. 28, 2007

(30) Foreign Application Priority Data

Dec. 28, 2005  (JP) ............... 2005-380171

(51) Int. Cl.
*H04B 7/00* (2006.01)
*H04Q 7/20* (2006.01)

(52) U.S. Cl. .............. 455/522; 455/13.4; 455/69; 455/572; 455/573

(58) Field of Classification Search ........... 455/13.4, 455/69, 522, 574, 566, 571, 572, 573
See application file for complete search history.

(56) References Cited

U.S. PATENT DOCUMENTS

| | | | |
|---|---|---|---|
| 5,905,914 A * | 5/1999 | Sakai et al. .............. 710/67 |
| 5,931,964 A | 8/1999 | Beming et al. |
| 5,943,610 A | 8/1999 | Endo |
| 5,987,326 A | 11/1999 | Tiedemann et al. |
| 6,119,018 A | 9/2000 | Kondo |
| 6,185,432 B1 | 2/2001 | Vembu |
| 6,272,355 B1 | 8/2001 | Lokio |
| 6,377,813 B1 | 4/2002 | Kansakoski et al. |
| 6,519,236 B1 | 2/2003 | Haartsen et al. |
| 6,587,696 B1 | 7/2003 | Ma et al. |
| 6,708,041 B1 | 3/2004 | Butovitsch et al. |
| 6,744,754 B1 | 6/2004 | Lee |
| 6,904,291 B2 | 6/2005 | Miyamoto et al. |
| 7,123,881 B2 | 10/2006 | Agin |
| 7,133,703 B2 * | 11/2006 | Aoshima et al. ............ 455/574 |
| 7,146,183 B2 | 12/2006 | Sato |
| 7,206,596 B2 | 4/2007 | Nishio |
| 7,409,223 B2 | 8/2008 | Hamabe |
| 2003/0071912 A1 * | 4/2003 | Minakuti ................ 348/372 |
| 2003/0162497 A1 * | 8/2003 | Curtiss et al. .............. 455/41 |

(Continued)

FOREIGN PATENT DOCUMENTS

CN  1267173 A  9/2000

(Continued)

OTHER PUBLICATIONS

Office Action dated Nov. 14, 2007 of corresponding Korean Patent Application 10-2006-0132395.

(Continued)

*Primary Examiner*—Tuan A Pham
(74) *Attorney, Agent, or Firm*—Canon U.S.A., Inc. IP Division

(57) ABSTRACT

Communication apparatuses each having a power consumption control function acquires information of a communication partner apparatus to determine on the basis of the acquired information whether to use the control function of itself or to use that of the communication partner apparatus for controlling power consumption in a wireless communication network. The control function of the determined apparatus controls the electric power of the wireless communication.

19 Claims, 15 Drawing Sheets

U.S. PATENT DOCUMENTS

| | | |
|---|---|---|
| 2004/0005906 A1 | 1/2004 | Okumura et al. |
| 2004/0038717 A1* | 2/2004 | Mahany et al. ............... 455/572 |
| 2004/0088641 A1 | 5/2004 | Torsner et al. |
| 2004/0106441 A1* | 6/2004 | Kazakevich et al. ........ 455/574 |
| 2006/0046651 A1* | 3/2006 | Hazell et al. ............... 455/41.2 |
| 2007/0104159 A1 | 5/2007 | Su |

FOREIGN PATENT DOCUMENTS

| | | |
|---|---|---|
| EP | 1450516 | 8/2004 |
| GB | 2 369 961 | 6/2002 |
| JP | 08-088579 | 4/1996 |
| JP | 09-275373 | 10/1997 |
| JP | 09-326754 | 12/1997 |
| JP | 2002-223168 A2 | 8/2002 |
| JP | 2003-347943 | 12/2003 |
| JP | 2003-348010 A | 12/2003 |
| JP | 2006-087023 | 3/2006 |
| KR | 2002-0096819 | 12/2002 |
| KR | 1020030042475 A | 5/2003 |
| RU | 2 175 466 | 10/2001 |
| WO | 01/24568 | 4/2001 |
| WO | 02/41521 | 5/2002 |
| WO | 2004/019519 | 3/2004 |
| WO | 2004/077761 | 9/2004 |

OTHER PUBLICATIONS

Notice of Allowance dated Nov. 12, 2007 of corresponding Russian Application 2006146040/09(050308) and translation.
Korean Office Action dated May 30, 2008 concerning application 10-2007-0037290.
European Search Report dated May 15, 2007 for European counterpart patent application No. 06025435.6-2412.
U.S. Appl. No. 11/737,968, filed Apr. 20, 2007, Shichino.
USPTO Office Action dated Dec. 8, 2009 for related case U.S. Appl. No. 11/737,968.
Office Action dated May 7, 2010 for Related U.S. Appl. No. 11/737,968.

* cited by examiner

F I G. 1
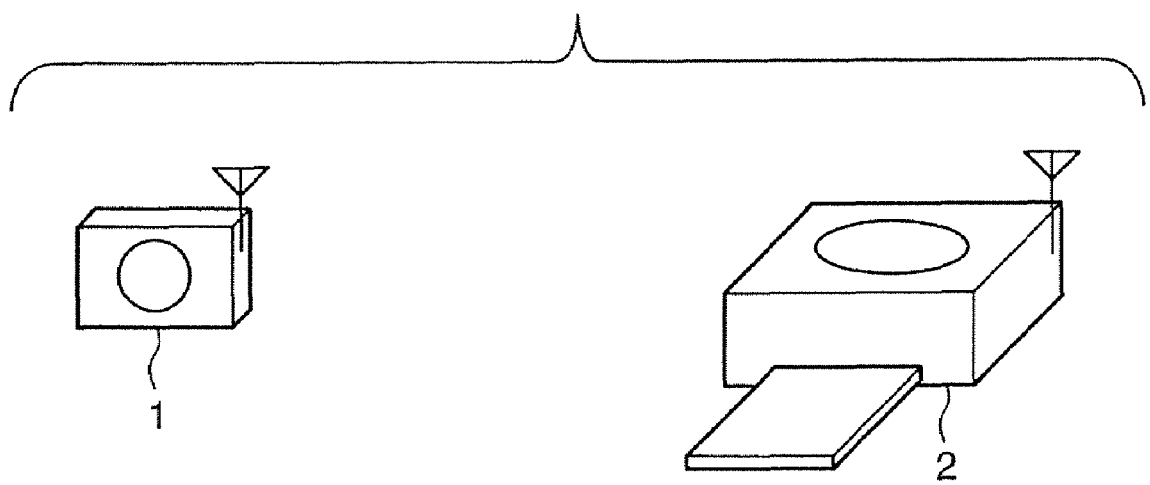

141

142

143

COMMUNICATION APPARATUS AND ELECTRIC POWER CONTROL METHOD

BACKGROUND OF THE INVENTION

1. Field of the Invention

The present invention relates to a communication apparatus having a control function of controlling power consumption and an electric power control method.

2. Description of the Related Art

It is common practice to build a LAN for sharing information and for effective use of an apparatus such as a printer for printing, in a case that a system including a plurality of computers is built. In recent years, a wireless LAN is used for such system. The wireless LAN is expected to be used more frequently in the future since it does not necessitate a LAN cable, and the convenience of a portable information processing apparatus such as a notebook PC can be effectively taken advantage of. As such wireless LAN, two types of networks are known. One is an infrastructure network which allows communication via a master station called an access point, and the other is an ad hoc network which allows communication between wireless terminals without an access point.

Conventionally, since many wireless terminals used in the wireless LAN are portable, a battery is used for a power supply. This causes a big problem associated with control of power consumption. In U.S. Pat. No. 5,943,610 (Japanese Patent Laid-Open No. 9-275373), a technique for executing electric power control on the basis of instructions from a master station is disclosed as a method for controlling transmission power in a wireless terminal. Japanese Patent Laid-Open No. 2003-347943 discloses a technique for controlling transmission power in a wireless terminal on the basis of the remaining battery level of a battery in the wireless terminal. Furthermore, Japanese Patent Laid-Open No. 8-88579 discloses a technique for controlling transmission power in a wireless terminal in accordance with the reception level of a signal from a communication partner, in a case that the wireless terminal is set in the power saving mode.

It was difficult to apply the conventional transmission power control based on instructions from a master station to an ad hoc network having no master station. If autonomous transmission power control in which each wireless terminal controls electric power by itself is applied to an ad hoc network, each wireless terminal controls transmission power independently. Therefore, transmission power of each wireless terminal can be excessively large or small. As a result, power consumption increases, or communication fails.

SUMMARY OF THE INVENTION

It is an object of the present invention to solve the conventional problem.

A feature of the present invention is to provide a communication apparatus and an electric power control method therefor, which can prevent the above problem in an ad hoc network.

According to the present invention, there is provided a communication apparatus comprising:

an information acquisition unit configured to acquire information of a communication partner apparatus;

an electric power control unit configured to control power consumption of the communication apparatus; and a control unit configured to control whether to allow the electric power control unit to execute electric power control of the communication apparatus on the basis of the information acquired by the information acquisition unit.

Further, according to the present invention, there is provided an electric power control method, comprising:

an information acquisition step of acquiring information from a communication partner apparatus;

an electric power control step of controlling the power consumption of a communication apparatus; and a control step of controlling whether to execute the electric power control in the electric power control step on the basis of the information acquired in the information acquisition step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a view showing the configuration of a wireless communication system according to the first embodiment of the present invention;

DESCRIPTION OF THE EMBODIMENTS

Figure 2:
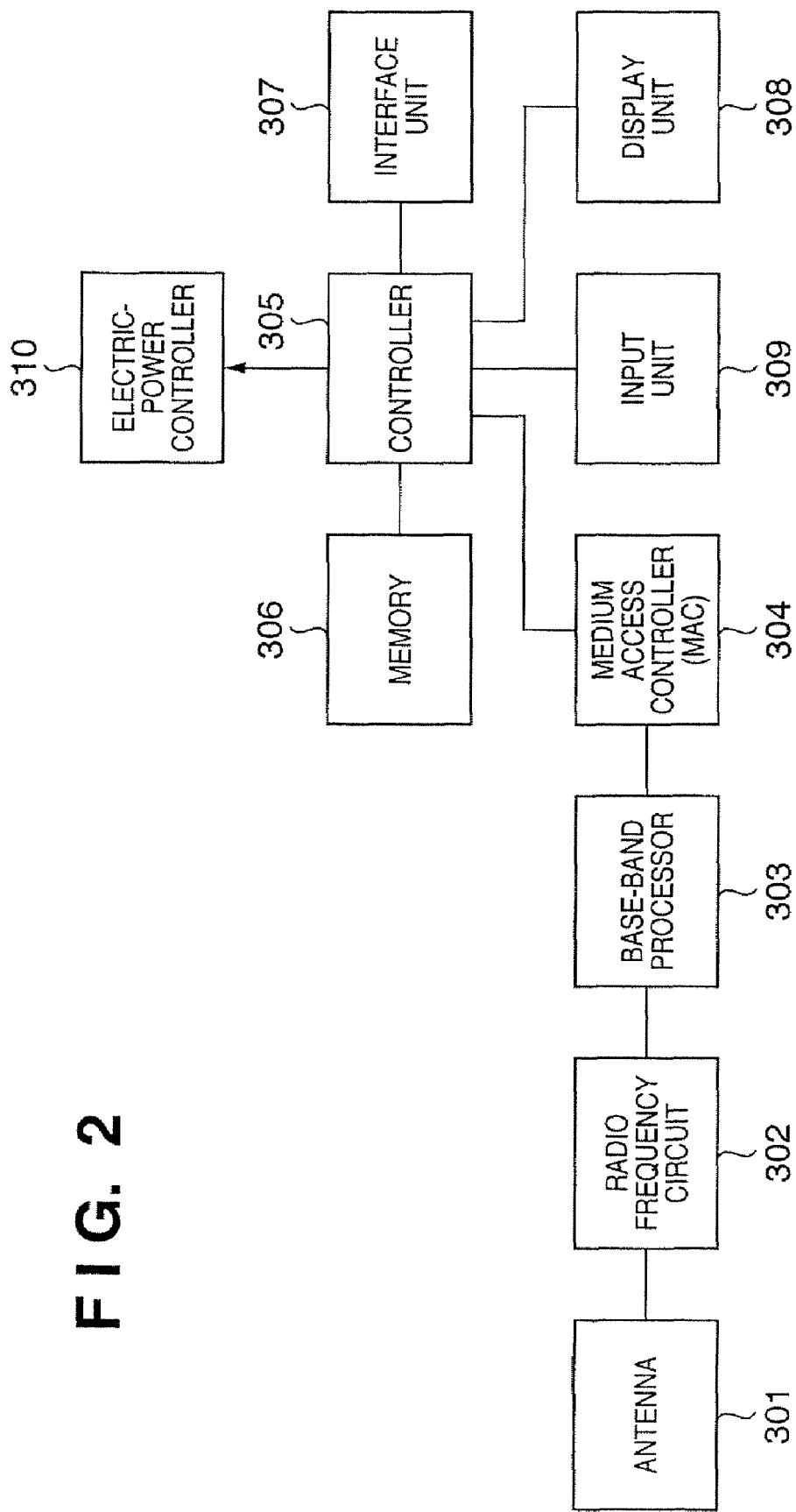
FIG. 2 is a functional block diagram for explaining a functional configuration implementing functions related to wireless communication and settings for wireless communication in wireless communication apparatuses 1 and 2 according to the first embodiment.

The preferred embodiments of the present invention will be described below in detail with reference to the accompanying drawings. The following embodiments do not limit the claims of the present invention, and not all combinations of features described in the embodiments are essential in solving means of the present invention.

First Embodiment

The configuration of a wireless communication system including wireless communication apparatuses according to the first embodiment of the present invention will be described with reference to FIG. 1.

FIG. 1 depicts a view showing the configuration of the wireless communication system according to the first embodiment of the present invention.

This wireless communication system is a wireless LAN system in ad hoc mode. In FIG. 1, reference numerals 1 and 2 denote wireless communication apparatuses (wireless terminals). In the first embodiment, the wireless terminal 1 is a digital camera (image input apparatus) and the wireless terminal 2 is a printer (image output apparatus).

FIG. 2 is a functional block diagram for explaining a functional configuration implementing functions related to wireless communication and settings for wireless communication in wireless communication apparatuses 1 and 2 according to the first embodiment.

Upon reception of radio data, an antenna 301 captures a radio signal. A radio frequency circuit 302 converts the radio signal into a base-band signal. A base-band processor 303 converts the converted base-band signal into a digital signal. The digital signal is converted into a predetermined data format in a medium access controller 304 and sent to a controller 305. Note that when the radio data is transmitted, the data flows in the opposite direction.

The controller 305 stores the data from the medium access controller 304 in a memory 306, or sends the data, via an interface unit 307, to an external device or unit (not shown) connected to the interface unit 307. The controller 305 receives the data from the external device or unit connected to the interface unit 307 and stores the data in the memory 306, or sends the data to the medium access controller 304. The controller 305 outputs the data stored in the memory 306 to the medium access controller 304, or sends the data to the external device or unit via the interface unit 307. The controller 305 executes various data processes, and outputs and displays the resultant data on a display unit 308. An input unit 309 includes a keyboard and pointing device, and is used for various settings designated by a user or for command input. An electric power controller 310 controls transmission power in the wireless terminal in accordance with the instructions of the controller 305 to execute power saving control for suppressing power consumption of the apparatus. Note that although transmission power control is explained in this specification, other power saving control such as receiving power control and transmission/receiving power control may be executed. The electric power controller 310 may be implemented in hardware, or in hardware and software.

The wireless communication system using the wireless communication apparatuses 1 and 2 according to the first embodiment operates as follows.

Figure 3:
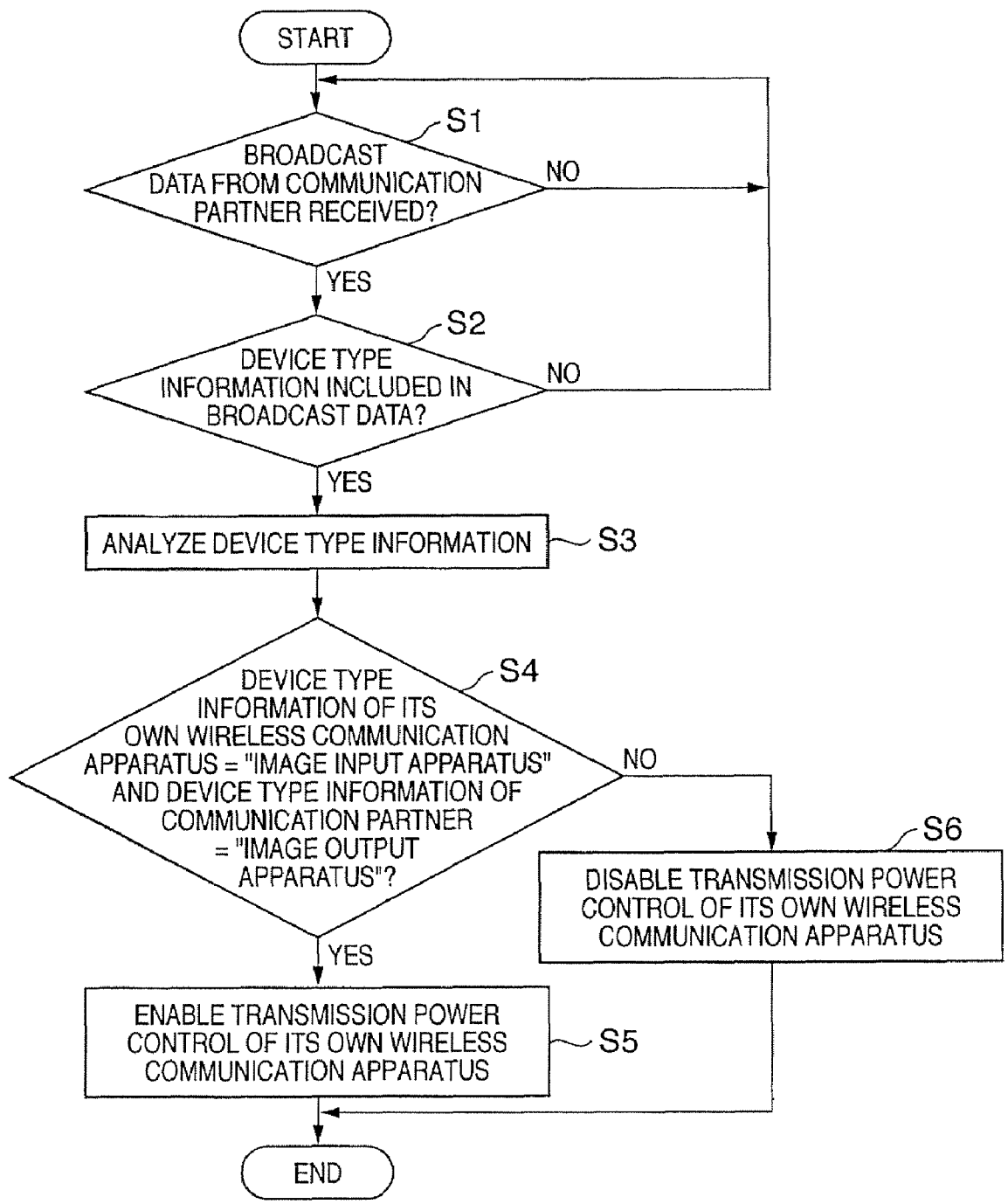
FIG. 3 is a flowchart for explaining the operation of the wireless communication apparatus according to the first embodiment.

FIG. 3 is a flowchart for explaining the operation of the wireless communication apparatuses 1 and 2 according to the first embodiment.

While processing is ongoing, a user sets the operating mode of each of the wireless communication apparatus 1 as a digital camera (image input apparatus) and the wireless communication apparatus 2 as a printer (image output apparatus) to ad hoc mode (which allows direct communication between wireless terminals without an access point). The user then sets an SSID (Service Set ID) as a network identifier and security setting to predetermined values to make the apparatuses communicable in ad hoc mode.

Each of the wireless communication apparatuses 1 and 2 transmits device type information under the control of the corresponding controller 305. More specifically, each of the wireless communication apparatuses 1 and 2 transmits the device type information as broadcast data approximately every 200 ms.

The controller 305 of each of the wireless communication apparatuses 1 and 2 receives the broadcast data from the communication partner in step S1. In step S2, the controller 305 determines whether the received data includes device type information. If the data does not include the device type information, the process returns to step S1; otherwise, the process advances to step S3 to analyze the received device type information.

In this manner, the wireless communication apparatus 1 as an image input apparatus recognizes that the wireless communication apparatus 2 as its communication partner is an image output apparatus. Thus, the wireless communication apparatus 1 determines "YES" in step S4, and the process advances to step S5. In step S5, the controller 305 of the wireless communication apparatus 1 enables the electric power control of its own electric power controller 310 on the basis of its device type information (image input apparatus) and that (image output apparatus) of its communication partner.

Furthermore, the wireless communication apparatus 2, as an image output apparatus, determines that its communication partner is an image input apparatus in step S4. Since the condition of step S4 is not met, the process advances to step S6. In step S6, the controller 305 of the wireless communication apparatus 2 disables the electric power control of its own electric power controller 310 on the basis of its device type information (image output apparatus) and that (image input apparatus) of its communication partner 1.

This allows the wireless communication apparatus 1 to execute power saving control using the electric power controller 310. Since only the wireless communication apparatus 1 controls the electric power, it is possible to maintain an ad hoc network capable of correct communication. Note that in the above description, in a case that it is determined in step S2 that the received data does not include the device type information, the process returns to step S1. However, in a case where it is determined that the received data does not include the device type information, the electric power control of its own electric power controller 310 may be disabled. This is because it is unknown how the electric power control of the partner apparatus is carried out.

Second Embodiment

The second embodiment of the present invention will now be explained.

Figure 4:
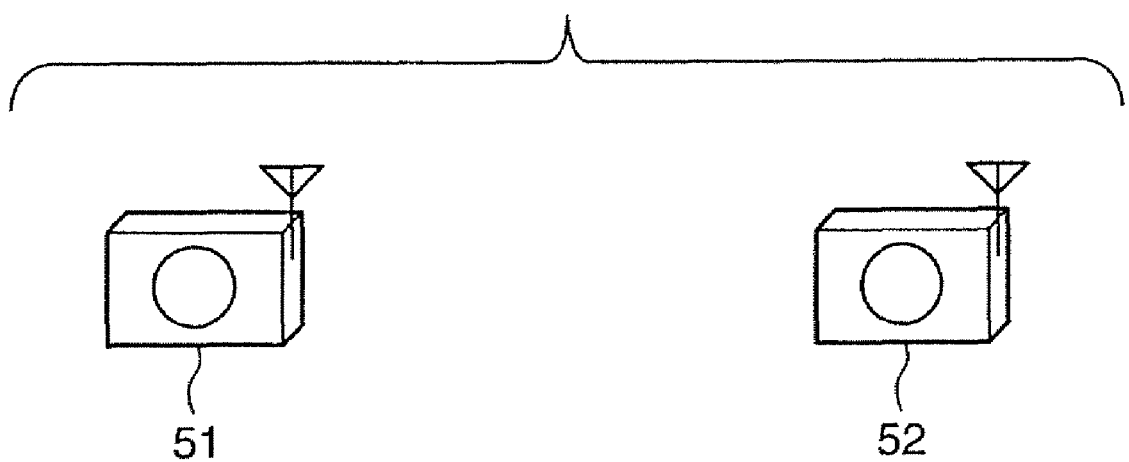
FIG. 4 depicts a view showing the configuration of a wireless communication system including wireless communication apparatuses according to the second embodiment of the present invention.

FIG. 4 depicts a view showing the configuration of a wireless communication system including wireless communication apparatuses according to the second embodiment of the present invention.

The wireless communication system is a wireless LAN system in ad hoc mode. In FIG. 4, reference numerals 51 and 52 denote wireless communication apparatuses. In the second embodiment, the wireless terminals 51 and 52 are digital cameras (image input apparatuses). Note that functional blocks related to wireless communication and settings for wireless communication in these wireless communication apparatuses are the same as those in FIG. 2 described above in the first embodiment, and a description thereof will be omitted.

The wireless communication system using the wireless communication apparatuses 51 and 52 according to the second embodiment operates as follows.

Figure 5:
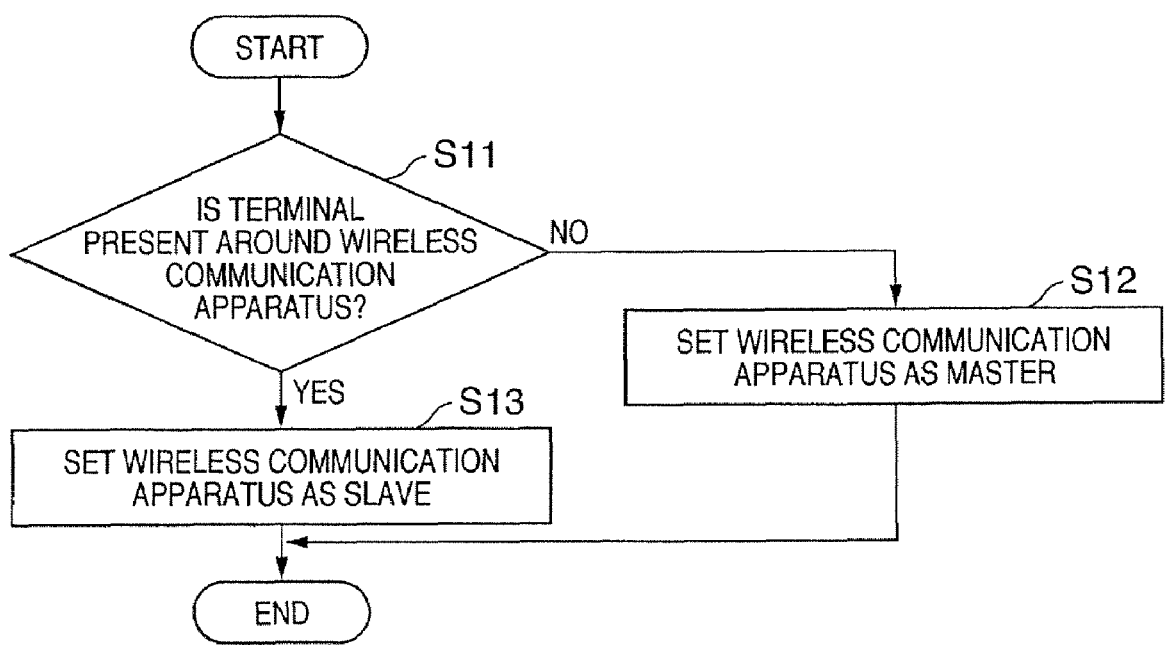
FIG. 5 is a flowchart for explaining the operation of the wireless communication apparatus according to the second embodiment.

FIG. 5 is a flowchart for explaining the operation of the wireless communication apparatuses 51 and 52 according to the second embodiment.

A user sets an operating mode of each of the wireless communication apparatuses 51 and 52 to ad hoc mode and sets an SSID and security setting to predetermined values to make the apparatuses ad hoc communicable.

The processing shown in the flowchart of FIG. 5 is performed by the wireless communication apparatus activated, i.e., by the wireless communication apparatus 51. The wireless communication apparatus 51 determines in step S11 whether a terminal is present around it. This determination is made on the basis of whether the wireless communication apparatus 51 receives broadcast data such as a beacon signal within a certain period of time. If the wireless communication apparatus 51 does not receive the signal such as a beacon signal, it determines that no wireless terminal is present around it. The process advances to step S12 to set the wireless communication apparatus 51 as a master. Similarly, the wireless communication apparatus 52, activated later, confirms in step S11 whether a terminal is present around it. In this case, since the wireless communication apparatus 51 has already been activated, the wireless communication apparatus 52 receives a beacon signal transmitted by the wireless communication apparatus 51. Thus, the wireless communication apparatus 52 determines that a wireless terminal is present around it. The process advances to step S13 to set the wireless communication apparatus 52 as a slave.

After the wireless communication apparatuses 51 and 52 are activated, each of the wireless communication apparatuses 51 and 52 transmits function information of its own under the control of a corresponding controller 305. More specifically, each of the wireless communication apparatuses 51 and 52 transmits, as broadcast data approximately every 150 ms, information indicating that the apparatus has a function of enabling or disabling the electric power control. This allows each wireless communication apparatus to confirm that a terminal is present around itself.

Figure 6:
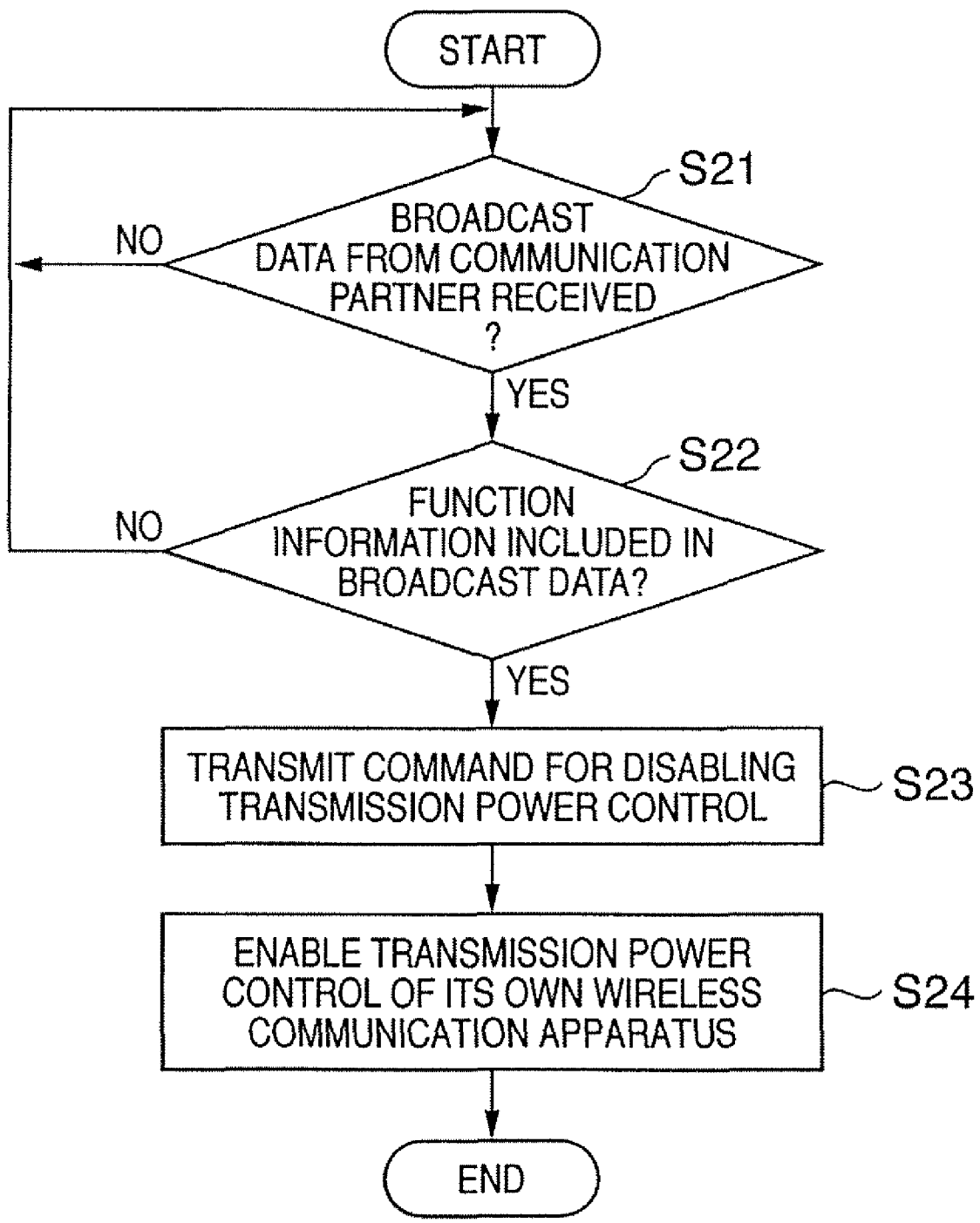
FIG. 6 is a flowchart for explaining processing in a master of the wireless communication system according to the second embodiment.

The wireless communication apparatus 51 is a master and therefore operates as shown in the flowchart of FIG. 6.

FIG. 6 is a flowchart for explaining processing in the master of the wireless communication system according to the second embodiment.

In step S21, the wireless communication apparatus 51 waits for the reception of the broadcast data from its communication partner. When the wireless communication apparatus 51 receives the data, the process advances to step S22 to determine whether the received data includes function information. If the received data includes the function information, the process advances to step S23 to determine whether or not the wireless communication apparatus 52 has a function of enabling or disabling the electric power control. In step S23, the wireless communication apparatus 51 sends the wireless communication apparatus 52 (slave) of a command to disable the electric power control. In step S24, the wireless communication apparatus 51 enables the electric power control of an electric power controller 310 of its own (wireless communication apparatus 51 (master)).

The controller 305 of the wireless communication apparatus 52 as a slave disables the electric power control of its own electric power controller 310 on the basis of the command transmitted in step S23. This allows only the wireless communication apparatus 51 as a master to execute the power saving control using the electric power controller 310.

Note that in the above description, the master enables the electric power control of its own electric power controller 310, and the slave disables the electric power control of its own electric power controller 310. However, the master may disable the electric power control of its own electric power controller 310, and the slave may enable the electric power control of its own electric power controller 310.

As described above, in the wireless communication system according to the second embodiment, only one wireless communication apparatus controls the electric power. Therefore, it is possible to maintain an ad hoc network capable of correct communication while avoiding communication failure and an increase in power consumption due to the excessively large or small transmission power of each wireless terminal.

Third Embodiment

The third embodiment of the present invention will now be described.

Figure 7:
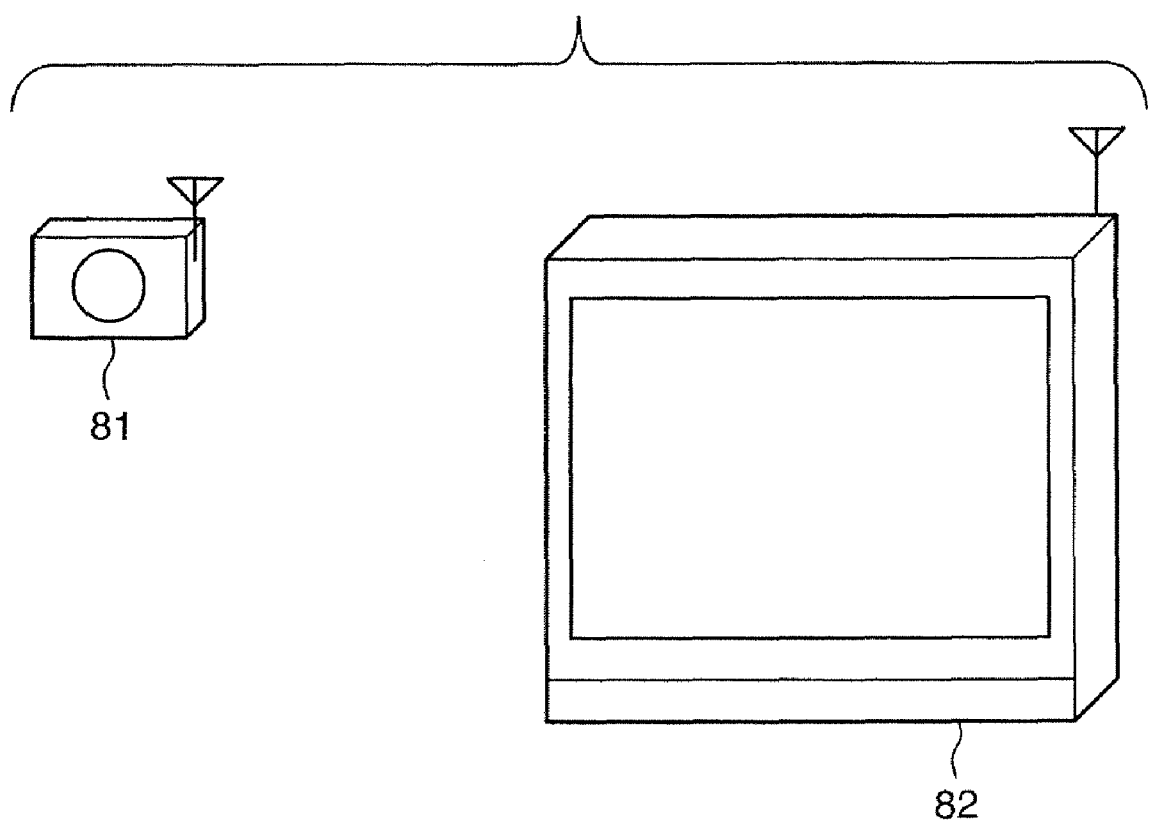
FIG. 7 depicts a view showing the configuration of a wireless communication system including wireless communication apparatuses according to the third embodiment of the present invention.

FIG. 7 depicts a view showing the configuration of a wireless communication system including wireless communication apparatuses according to the third embodiment of the present invention.

The wireless communication system is a wireless LAN system in ad hoc mode. In FIG. 7, reference numerals 81 and 82 denote wireless communication apparatuses. Functional blocks related to wireless communication and settings for wireless communication in the wireless communication apparatuses 81 and 82 are the same as those in FIG. 2 described above in the first embodiment. In the third embodiment, the wireless communication apparatus 81 is a digital camera (image input apparatus), and the wireless communication apparatus 82 is a television set (image output apparatus).

The wireless communication system using the wireless communication apparatuses 81 and 82 according to the third embodiment operates as follows.

A user sets the operating mode of each of the wireless communication apparatus 81 as a battery-driven type of apparatus, and the wireless communication apparatus 82 as a commercial power supply driven type of apparatus to ad hoc mode. The user then sets an SSID and security setting to predetermined values to set the apparatuses communicable in ad hoc mode. After that, each of the wireless communication apparatuses 81 and 82 transmits its power supply type information based on the control of a corresponding controller 305. More specifically, each of the wireless communication apparatuses 81 and 82 transmits the power supply type information as broadcast data approximately every 250 ms.

Figure 8:
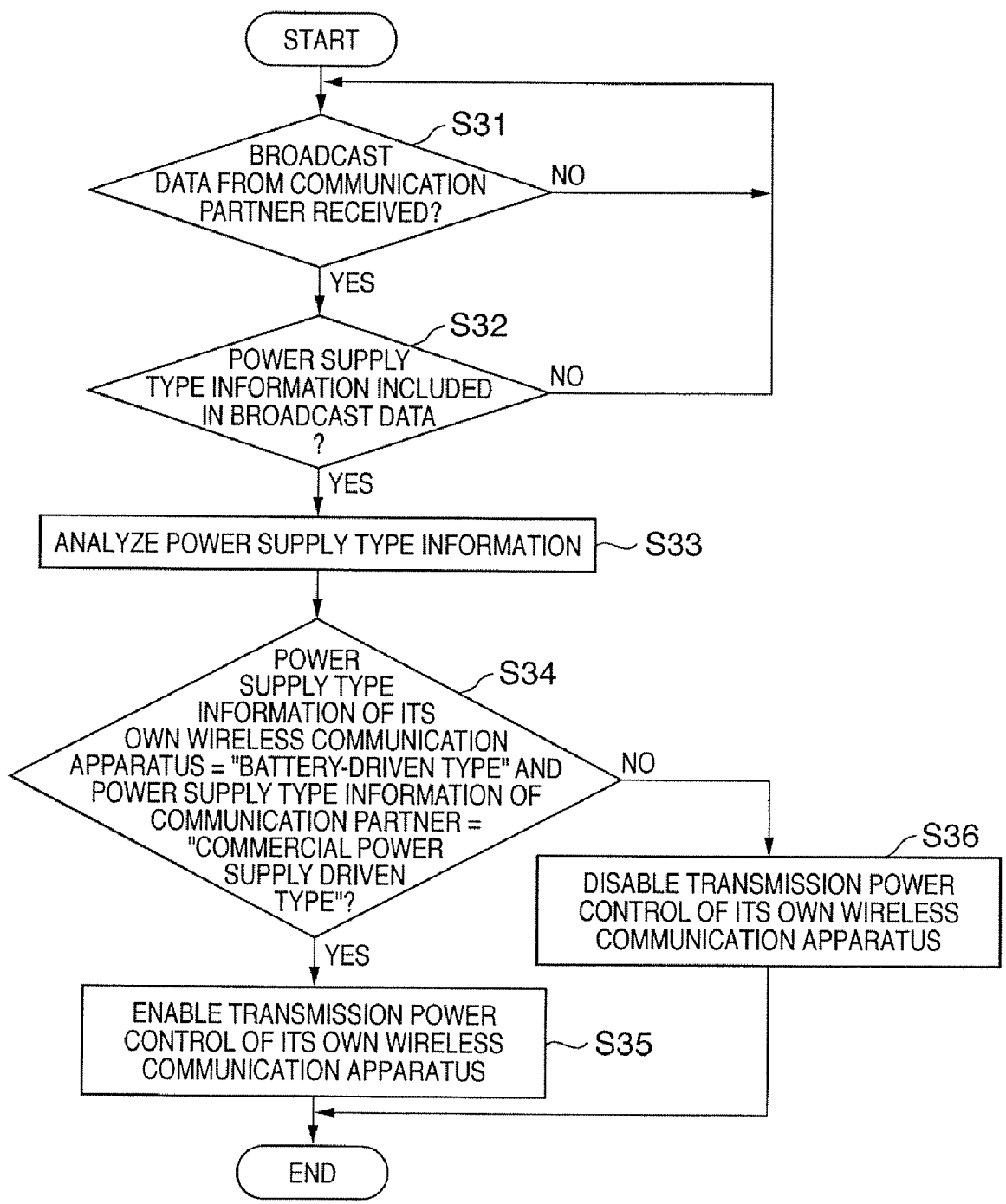
FIG. 8 is a flowchart for explaining processing of the wireless communication apparatus according to the third embodiment.

FIG. 8 is a flowchart explaining processing of the wireless communication apparatuses 81 and 82 according to the third embodiment.

When the controller 305 of each of the wireless communication apparatuses 81 and 82 receives broadcast data from its communication partner in step S31, the process advances to step S32 to determine whether the received data includes power supply type information. If the received data includes the power supply type information, the process advances to step S33 to analyze the power supply type information. If NO in step S31 or S32, the process returns to step S31 to repeat the above-described processing.

The wireless communication apparatus 81, as a battery-driven type apparatus, recognizes that the wireless communication apparatus 81 itself is of a battery-driven type and the wireless terminal as the communication partner is of a commercial power supply driven type. Therefore, the process advances to step S35 from step S34. In step S35, the controller 305 of the wireless communication apparatus 81 enables the electric power control of its electric power controller 310 on the basis of the power supply type information (battery-driven type) and that (commercial power supply driven type) of its communication partner. This is because the commercial power supply driven type apparatus need not execute control for suppressing power consumption.

Furthermore, the wireless communication apparatus 82, as a commercial power supply driven type apparatus, confirms in step S34 that its communication partner is of a battery-driven type. The process advances to step S36. In step S36, the controller 305 of the wireless communication apparatus 82 disables the electric power control of its electric power controller 310 on the basis of the power supply type information (commercial power supply driven type) and that (battery-driven type) of the communication partner.

This allows the wireless communication apparatus 81 to execute the power saving control of the electric power controller 310. In this system, since only one wireless communication apparatus executes electric power control, it is possible to maintain an ad hoc network capable of correct communication while avoiding communication failure.

Fourth Embodiment

The fourth embodiment of the present invention will now be explained.

Figure 9:
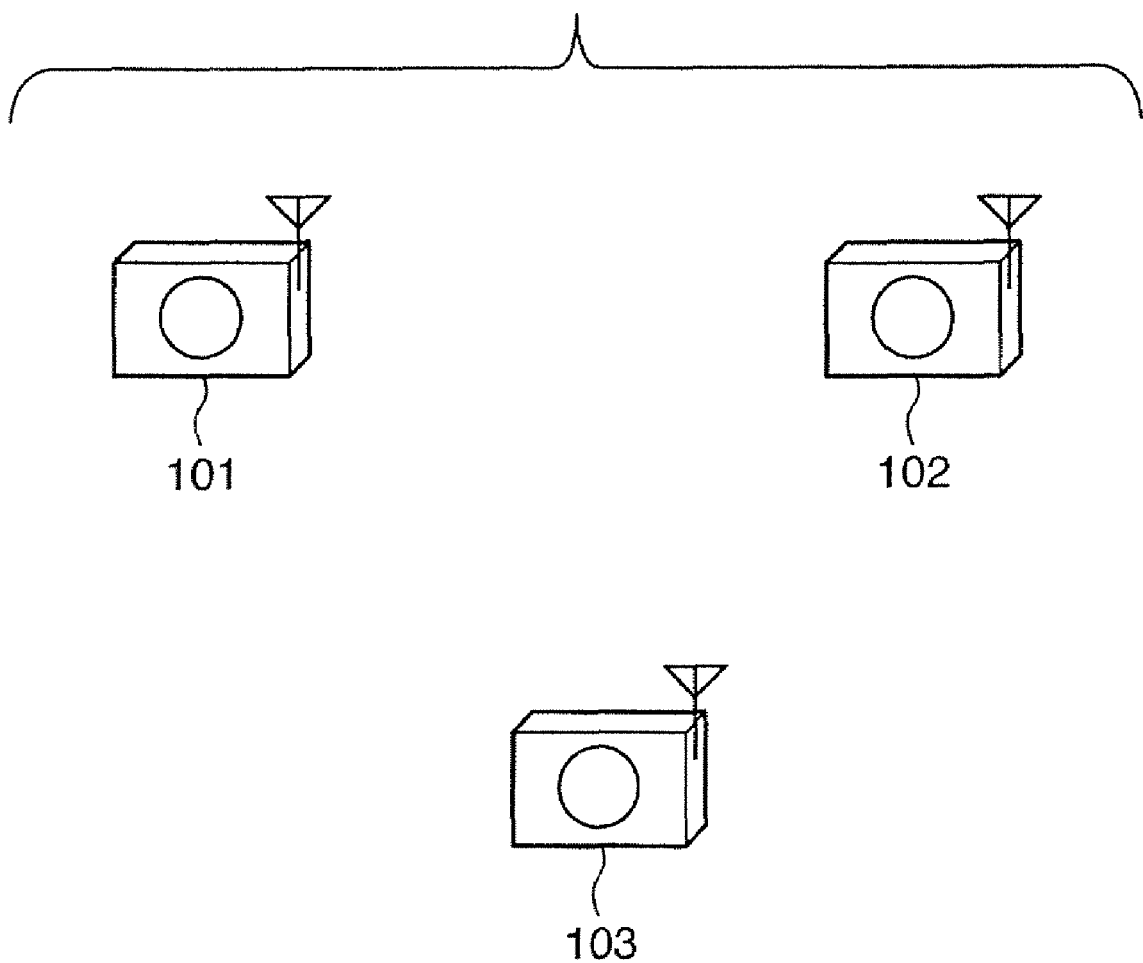
FIG. 9 depicts a view showing the configuration of a wireless communication system including wireless communication apparatuses according to the fourth embodiment of the present invention.

FIG. 9 depicts a view showing the configuration of a wireless communication system including wireless communication apparatuses according to the fourth embodiment of the present invention.

The wireless communication system is a wireless LAN system in ad hoc mode. In FIG. 9, reference numerals 101 to 103 denote wireless communication apparatuses. The wireless communication apparatuses 101 to 103 are digital cameras (image input apparatuses). Functional blocks related to wireless communication and settings for wireless communication in the wireless communication apparatuses 101 to 103 are the same as those in FIG. 2 described above in the first embodiment.

Figure 10:
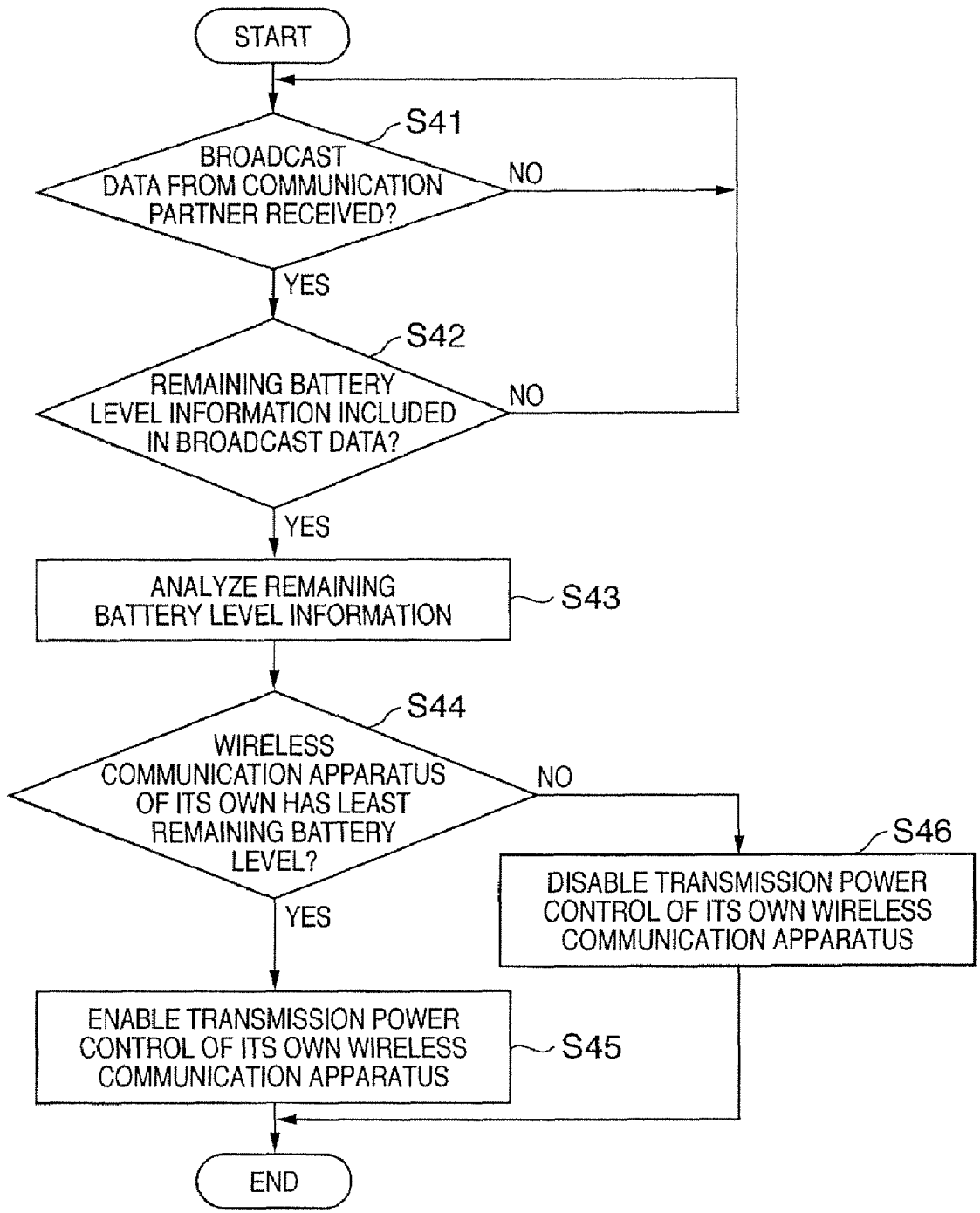
FIG. 10 is a flowchart for explaining processing in the wireless communication apparatus according to the fourth embodiment.

FIG. 10 is a flowchart for explaining processing in the wireless communication apparatuses 101 to 103 according to the fourth embodiment.

Before processing begins, a user sets the operating mode of each of the wireless communication apparatuses 101, 102, and 103 to ad hoc mode, and sets SSID and security settings to predetermined values to make them ad hoc communicable. After that, each of the wireless communication apparatuses 101, 102 and 103 transmits its remaining battery level information under the control of a corresponding controller 305. More specifically, each of the wireless communication apparatuses 101, 102, and 103 transmits the remaining battery level information of its own battery as broadcast data approximately every 750 ms.

Based on these assumptions, when the controller 305 of each of the wireless communication apparatuses 101, 102, and 103 receives the broadcast data in step S41, the process advances to step S42 to determine whether the data includes remaining battery level information of each own battery. If the data does not include the information, the process returns to step S41; otherwise, the process advances to step S43 to analyze the information.

In step S44, the controller 305 of each of the wireless communication apparatuses 101, 102, and 103 determines whether the corresponding wireless communication apparatus has the least remaining battery level among the apparatuses 101, 102, and 103. If the battery level of the corresponding wireless communication apparatus is the least remaining battery level, the process advances to step S45 to enable the electric power control of its own electric power controller 310; otherwise, the process advances to step S46 to disable the electric power control of its own electric power controller 310.

This allows only the wireless communication apparatus having the least remaining battery level to carry out the power saving control of the electric power controller 310. In this wireless communication system, since only one wireless communication apparatus controls electric power, it is possible to maintain an ad hoc network capable of correct communication while avoiding communication failure.

Fifth Embodiment

The fifth embodiment of the present invention will now be described.

Figure 11:
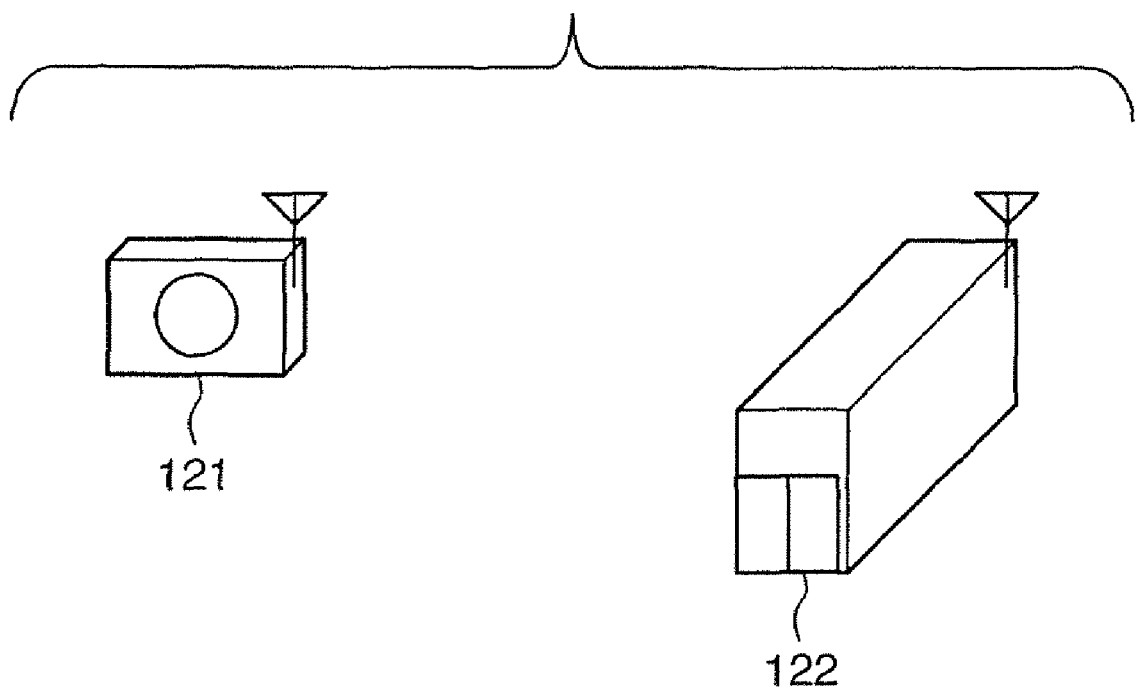
FIG. 11 depicts a view showing the configuration of a wireless communication system including wireless communication apparatuses according to the fifth embodiment of the present invention.

FIG. 11 depicts a view showing the configuration of a wireless communication system including wireless communication apparatuses according to the fifth embodiment of the present invention.

The wireless communication system is a wireless LAN system in an ad hoc mode. In FIG. 11, reference numerals 121 and 122 denote wireless communication apparatuses. In the fifth embodiment, the wireless communication apparatus 121 is a digital camera (image input apparatus) and the wireless communication apparatus 122 is a storage device (image storage apparatus). Functional blocks related to wireless communication and settings for wireless communication in the wireless communication apparatuses 121 and 122 are the same as those in FIG. 2 described above in the first embodiment.

Figure 12:
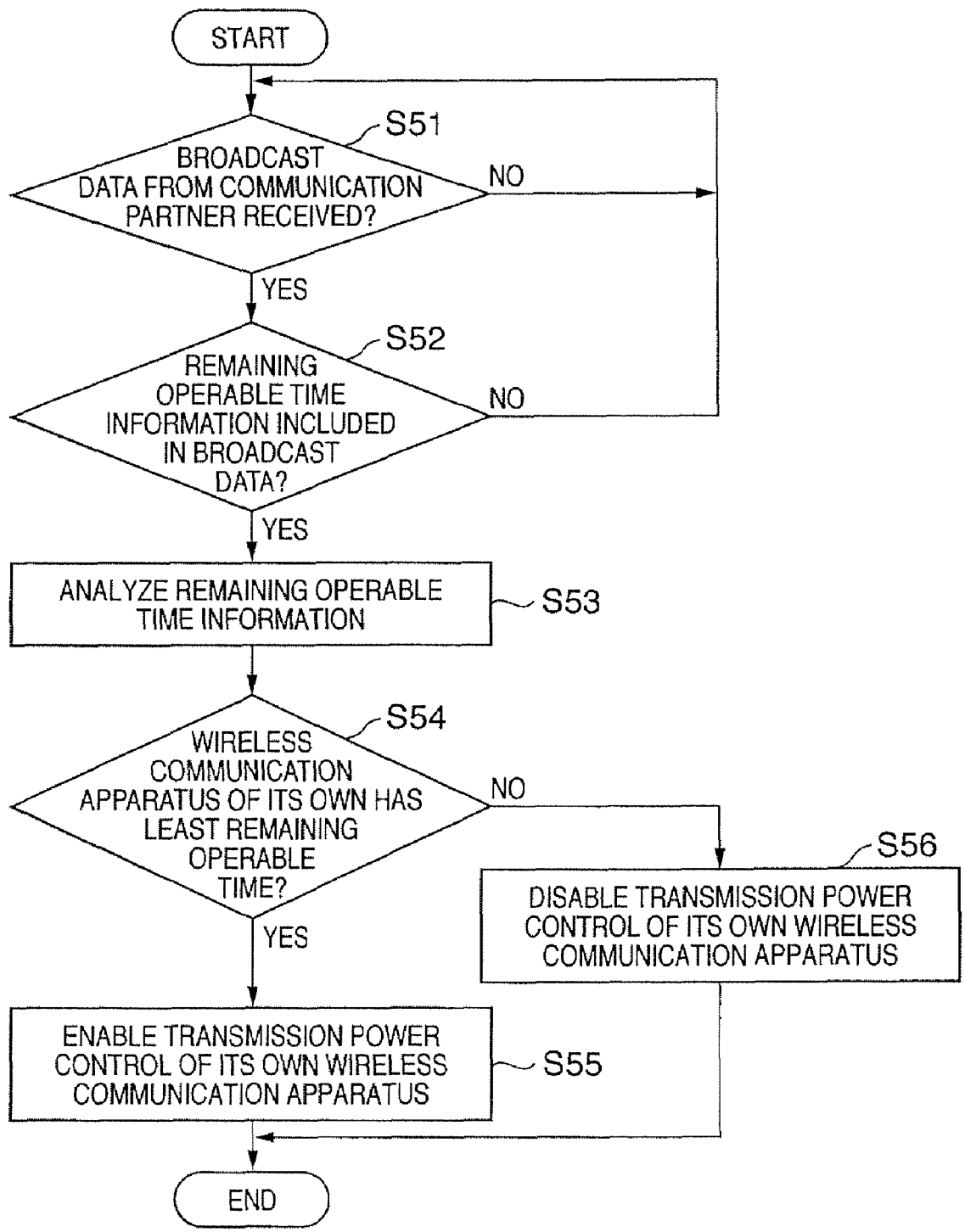
FIG. 12 is a flowchart for explaining processing in the wireless communication apparatus according to the fifth embodiment.

FIG. 12 is a flowchart explaining processing in the wireless communication apparatuses 121 and 122 according to the fifth embodiment.

A user sets the operating mode of each of the wireless communication apparatus 121 as an image input apparatus and the wireless communication apparatus 122 as an image storage apparatus to ad hoc mode, and sets an SSID and security settings to predetermined values to make the apparatuses ad hoc communicable.

Under the control of a controller 305, each of the wireless communication apparatuses 121 and 122 transmits its remaining operable time period information. More specifically, each of the wireless communication apparatuses 121 and 122 transmits its remaining operable time period information as broadcast data approximately every 500 ms. In the fifth embodiment, the remaining operable time period may be determined in accordance with the remaining battery level of each wireless communication apparatus. However, if, for example, a valid time period is set for the apparatus, the remaining operable time period may be determined in accordance with the effective remaining time period.

In step S51, when the controller 305 of each of the wireless communication apparatuses 121 and 122 receives the broadcast data from its communication partner, the process advances to step S52. In step S52, the controller 305 determines whether the data includes remaining operable time period information. If the data includes remaining operable time period information, the process advances to step S53 to analyze the information.

In step S54, the controller 305 of each of the wireless communication apparatuses 121 and 122 determines whether the apparatus has the least remaining operable time period by analyzing the information and confirming its own remaining operable time period. If the corresponding wireless communication apparatus has the least remaining operable time period, the process advances to step S55 to enable the electric power control of its own electric power controller 310, otherwise, the process advances to step S56 to disable the electric power control of its own electric power controller 310.

This allows only the wireless communication apparatus having the least remaining operable time period (e.g., the least remaining battery level) to execute power saving control. That is, since only one wireless communication apparatus having the least remaining operable time period controls electric power, it is possible to maintain an ad hoc network capable of correct communication while avoiding communication failure.

Sixth Embodiment

The sixth embodiment of the present invention will now be explained.

Figure 13:
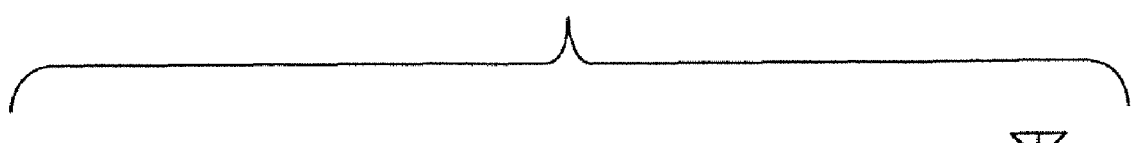
FIG. 13 depicts a view showing the configuration of a wireless communication system including wireless communication apparatuses according to the sixth embodiment of the present invention.
Figure 13:
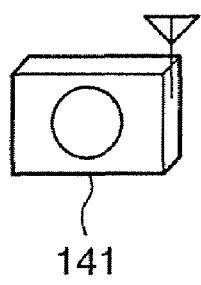
Figure 13:
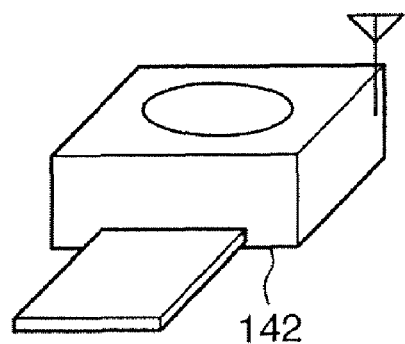
Figure 13:
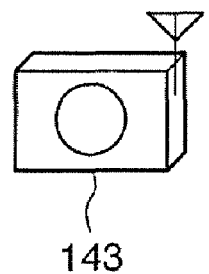

FIG. 13 depicts a view showing the configuration of a wireless communication system including wireless communication apparatuses according to the sixth embodiment of the present invention.

The configuration of the wireless communication system including the wireless communication apparatuses according to the sixth embodiment will be described with reference to FIG. 13. The wireless communication system is a wireless LAN system in an ad hoc mode. In FIG. 13, reference numerals 141 to 143 denote wireless communication apparatuses. In the sixth embodiment, the wireless communication apparatuses 141 and 143 are digital cameras (image input apparatuses) and the wireless communication apparatus 142 is a printer (image output apparatus). Functional blocks related to wireless communication and settings for wireless communication in these wireless communication apparatuses 141 to 143 are the same as those in FIG. 2, described above in the first embodiment.

A user sets the operating mode of each of the wireless communication apparatus 141 as an image input apparatus, and the wireless communication apparatus 142 as an image output apparatus to ad hoc mode, and sets an SSID and security settings to predetermined values to make them ad hoc communicable.

Figure 14:
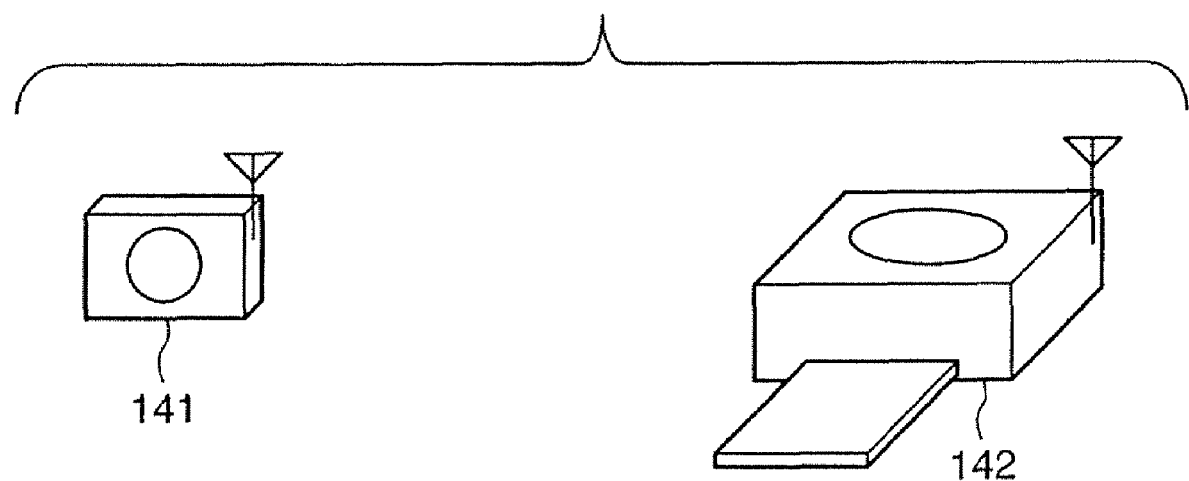
FIG. 14 depicts a view showing a state in which wireless communication apparatuses (an image input apparatus and image output apparatus) according to the sixth embodiment are in an ad hoc communicable state.

FIG. 14 depicts a view showing a state in which the wireless communication apparatuses (an image input apparatus and image output apparatus) according to the sixth embodiment are in an ad hoc communicable state.

In this case, by performing the same operations as those in the first to fifth embodiments described above, the wireless communication apparatus 141 enables the electric power control of its own electric power controller 310 and the wireless communication apparatus 142 disables the electric power control of its own electric power controller 310.

After this, a user sets the operating mode of the wireless communication apparatus 143 as an image input apparatus to ad hoc mode, and sets SSID and security settings to predetermined values. In this manner, the wireless communication apparatus 143 joins the ad hoc network. Under the control of its own controller 305, once the power supply of each of the wireless communication apparatuses 141, 142, and 143 is turned on, each apparatus transmits device information of its own. More specifically, each of the wireless communication apparatuses 141, 142, and 143 transmits its MAC (Medium Access Control) address as broadcast data approximately every 100 ms.

Figure 15:
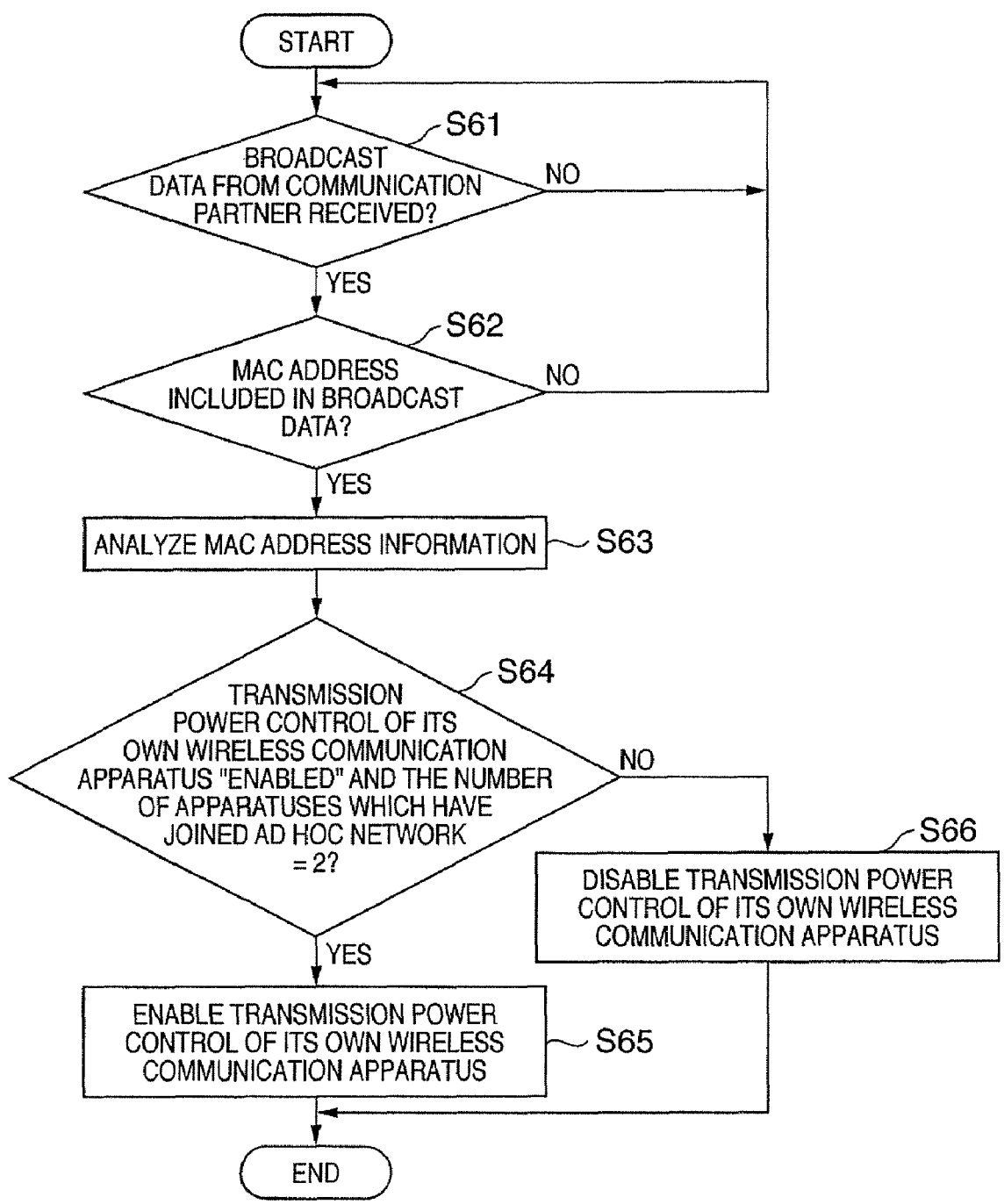
FIG. 15 is a flowchart for explaining processing in the wireless communication apparatus according to the sixth embodiment.

FIG. 15, is a flowchart explaining processing on the wireless communication apparatuses 141, 142, and 143 according to the sixth embodiment of the present invention.

When the controller 305 of each of the wireless communication apparatuses 141, 142, and 143 receives the broadcast data in step S61, the process advances to step S62. In step S62, the controller 305 determines whether the received data includes a MAC address. If the received data includes the MAC address, the process advances to step S63 to analyze the information.

By analyzing the information and confirming its own MAC address in step S63, the controller 305 of each of the wireless communication apparatuses 141, 142, and 143 recognizes the number of wireless communication apparatuses which have joined the ad hoc network. In step S64, the controller 305 determines whether the number of wireless communication apparatuses which have joined the ad hoc network is "2". If the number of apparatuses is "2", and it is determined that the electric power control by its own electric power controller 310 is to be enabled in accordance with any of the first through the fifth embodiments, then, the process advances to step S65 to enable the electric power control of its own electric power controller 310. If the number of apparatuses is not "2", the process advances to step S66 to disable the electric power advances to step S66 to disable the electric power control of its own electric power controller 310. If the number of apparatuses Is not "2" or if it is determined in step S64 that the electric power control by its own electric power controller 310 is not to be enabled in accordance with any of the firs through the fifth embodiments, then, the process advances to step S66 to disable the electric power control of its own electric power controller 310.

As described above, according to the sixth embodiment, each of the wireless communication apparatuses 142 and 143 disables the electric power control. This makes it possible to prevent two or more wireless communication apparatuses from controlling electric power. Therefore, it is possible to maintain an ad hoc network capable of correct communication while avoiding communication failure.

Other Embodiments

The embodiments of the present invention have been described above in detail. The present invention may be applied to a system including a plurality of devices or an apparatus formed by a single device.

The present invention is also achieved by supplying a software program implementing the functions of the above-described embodiments to the system or apparatus directly or from a remote place, and reading out and executing the supplied program by the computer of the system or apparatus. In this case, the form of the present invention need not be a program as long as the functionality of the program is provided.

The present invention is therefore implemented by program codes installed in the computer in order to implement functional processes of the present invention by the computer. That is, the claims of the present invention include a computer program for implementing functional processes of the present invention. In this case, the program form is arbitrary, such as an object code, a program executed by an interpreter, or script data supplied to an OS as long as it provides the functionality of the program.

As a recording medium for supplying the program, for example, a floppy® disk, hard disk, optical disk, magneto-optical disk, MO, CD-ROM, CD-R, CD-RW, magnetic tape, nonvolatile memory card, ROM, and DVD (DVD-ROM, DVD-R) may be used.

As another program supply method, the program can be supplied by connecting a client computer to an Internet Web page via the browser of the client computer, and downloading the program from the Web page to a recording medium such as a hard disk. The downloaded program may be the computer program of the present invention or a compressed file containing an automatic installing function. The program can also be implemented by grouping program codes which form the program of the present invention into a plurality of files, and downloading the files from different Web pages. That is, the claims of the present invention also include a WWW server which allows a plurality of users to download the program files for implementing functional processes of the present invention using a computer.

The program of the present invention can be encrypted, stored in a recording medium such as a CD-ROM, and distributed to the user. In this case, a user who satisfies predetermined conditions is prompted to download decryption key information from a Web page via the Internet and the program encrypted using that key information may be installed in a computer in an executable form.

The functions of the above-described embodiments are implemented when the computer executes the readout program. Also, the functions of the above-described embodiments are implemented when an OS or the like running on the computer performs some or all of actual processes on the basis of the instructions of the program.

The program readout from the recording medium may be written to the memory of a function expansion board inserted into the computer or the memory of a function expansion unit connected to the computer. In this case, the functions of the above-described embodiments are implemented when the CPU of the function expansion board or function expansion unit performs some or all of actual processes on the basis of the instructions of the program after the program is written to the function expansion board or function expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-380171, filed Dec. 28, 2005, which is hereby incorporated by reference herein in its entirety.

What is claimed is:

1. A communication apparatus for directly communicating with a partner apparatus without relay of a base station, the apparatus comprising:

an information acquisition unit configured to acquire information of one of a device type, a function, an electric power supply type, a remaining battery level, and an operable time period of the communication partner apparatus;

an electric power control unit configured to perform transmission/receiving electric power control of the communication apparatus;

a determination unit configured to determine a number of communication apparatuses which have joined an ad hoc network; and a control unit configured to control whether to cause the electric power control unit to perform the transmission/receiving electric power control of the communication apparatus based on the information acquired by the information acquisition unit, wherein the control unit does not cause the electric power control unit to perform the transmission/receiving electric power control of the communication apparatus in a case that the number determined by the determination unit is greater than a predetermined number.

2. The apparatus according to claim 1, wherein the information of the communication partner apparatus represents the device type of the communication partner apparatus.

3. The apparatus according to claim 1, wherein the information of the communication partner apparatus is associated with a function of the communication partner apparatus.

4. The apparatus according to claim 1, wherein the information of the communication partner apparatus represents the power supply type of the communication partner apparatus.

5. The apparatus according to claim 1, wherein the information of the communication partner apparatus represents the remaining battery level of the communication partner apparatus.

6. The apparatus according to claim 1, wherein the information of the communication partner apparatus represents an operable time period of the communication partner apparatus.

7. The apparatus according to claim 2, wherein the control unit causes the electric power control unit to perform the transmission/receiving electric power control of the communication apparatus, in a case that the communication partner apparatus is an image output apparatus and the communication apparatus is an image input apparatus.

8. The apparatus according to claim 3, wherein the control unit causes the electric power control unit to perform the transmission/receiving electric power control of the communication apparatus, in a case that the communication partner apparatus is a slave and the communication apparatus is a master.

9. The apparatus according to claim 8, further comprising a designation unit configured to designate the electric power control unit to not perform the transmission/receiving electric power control, in a case that the communication partner apparatus is a slave.

10. The apparatus according to claim 4, wherein the control unit causes the electric power control unit to perform the transmission/receiving electric power control of the communication apparatus, in a case that the communication partner apparatus is of a commercial power supply driven type and the communication apparatus is of a battery-driven type.

11. The apparatus according to claim 5, wherein the control unit causes the electric power control unit to perform the transmission/receiving electric power control of the communication apparatus, in a case that the communication apparatus has a least remaining battery level.

12. The apparatus according to claim 6, wherein the control unit causes the electric power control unit to perform the transmission/receiving electric power control of the communication apparatus, in a case that the communication apparatus has a least operable time period.

13. The apparatus according to claim 1, wherein the information acquisition unit receives broadcast data from a wireless terminal included in a network, and acquires the information from the communication partner apparatus.

14. A method of controlling an electric power of a communication apparatus for directly communicating with a communication partner apparatus without relay of a base station, the method comprising:

an information acquisition step of acquiring information of one of a device type, a function, an electric power supply type, a remaining battery level, and an operable time period of the communication partner apparatus;

an electric power control step of performing a transmission/receiving electric power control of the communication apparatus;

a determination step of determining a number of communication apparatuses which have joined an ad hoc network; and a control step of controlling whether to cause the electric power control step to perform the transmission/receiving electric power control of the communication apparatus based on the information acquired in the information acquisition step, wherein the control step does not cause the electric power control unit to perform the transmission/receiving electric power control of the communication apparatus in a case that the number determined in the determination step is greater than a predetermined number.

15. The method of controlling an electric power of a communication apparatus according to claim 14, wherein the information acquisition step acquires information of a device type of the communication partner apparatus.

16. The method of controlling an electric power of a communication apparatus according to claim 14, wherein the information acquisition step acquires information associated with a function of the communication partner apparatus.

17. The method of controlling an electric power of a communication apparatus according to claim 14, wherein the information acquisition step acquires information representing an electric power supply type of the communication partner apparatus.

18. The method of controlling an electric power of a communication apparatus according to claim 14, wherein the information acquisition step acquires information representing a remaining battery level of the communication partner apparatus.

19. The method of controlling an electric power of a communication apparatus according to claim 14, wherein the information acquisition step acquires information representing an operable time period of the communication partner apparatus.

* * * * *